(12) United States Patent  (10) Patent No.: US 7,565,178 B1
Sitachitt et al.  (45) Date of Patent: Jul. 21, 2009

(54) PORTABLE HANDSET WITH INTEGRATED SPEAKER

(75) Inventors: Sidney Sitachitt, Carlsbad, CA (US); Sam Shifron, San Diego, CA (US); James D. Brownlie, San Diego, CA (US); Gregory L. Williams, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 399 days.

(21) Appl. No.: 11/205,432

(22) Filed: Aug. 16, 2005

(51) Int. Cl.
*H04M 1/00* (2006.01)
(52) U.S. Cl. .............. 455/569.1; 455/550.1; 455/575.8; 455/90.3; 455/575.1; 381/353; 381/334; 381/339; 381/386; 381/345; 381/361; 379/430; 379/433.1; 379/433.02
(58) Field of Classification Search ............. 455/550.1, 455/575.8, 90.3, 569.1, 575.1; 381/353, 381/334, 339, 386, 345, 361; 379/430, 433.1, 379/433.02
See application file for complete search history.

(56) References Cited

U.S. PATENT DOCUMENTS

| | | | |
|---|---|---|---|
| 4,081,631 A | | 3/1978 | Feder |
| 5,721,787 A | * | 2/1998 | Neibaur et al. .............. 381/386 |
| 5,883,966 A | * | 3/1999 | Kubo ......................... 381/386 |
| 6,137,883 A | * | 10/2000 | Kaschke et al. ........ 379/433.07 |
| 6,526,150 B2 | * | 2/2003 | Kelly et al. .................. 381/353 |
| 6,717,074 B2 | * | 4/2004 | Lu .............................. 200/5 R |
| 6,788,793 B2 | * | 9/2004 | Tanemura et al. ........... 381/152 |
| 7,272,422 B2 | * | 9/2007 | Nagasawa et al. ......... 455/575.1 |
| 7,415,290 B2 | * | 8/2008 | Murray et al. ........... 455/569.1 |
| 2004/0081329 A1 | | 4/2004 | Huang et al. |
| 2005/0239404 A1 | * | 10/2005 | Karabinis .................. 455/12.1 |

* cited by examiner

*Primary Examiner*—Lana N. Le
*Assistant Examiner*—Ping Y Hsieh

(57) ABSTRACT

A portable wireless handset with enhanced acoustic functions is disclosed having a chamber gasket that has an opening sized to receive a speaker. When inserted into the opening, the speaker seals to the chamber gasket. The chamber gasket also seals to a support surface, so that a sealed acoustic chamber is created. The keypad has an opening in the user interface area for receiving a speaker, and a navigation input key may be positioned over the speaker. In this way, the speaker shares an area with the navigation key, and projects sounds through vents in the navigation key. With the speaker sealed to the keypad, and the keypad sealed to a printed circuit board, a sealed acoustic chamber is formed. Acoustic energy emitted from the back of the speaker is received into the sealed chamber, thereby improving the sound quality for sound projected from the front of the speaker.

18 Claims, 5 Drawing Sheets

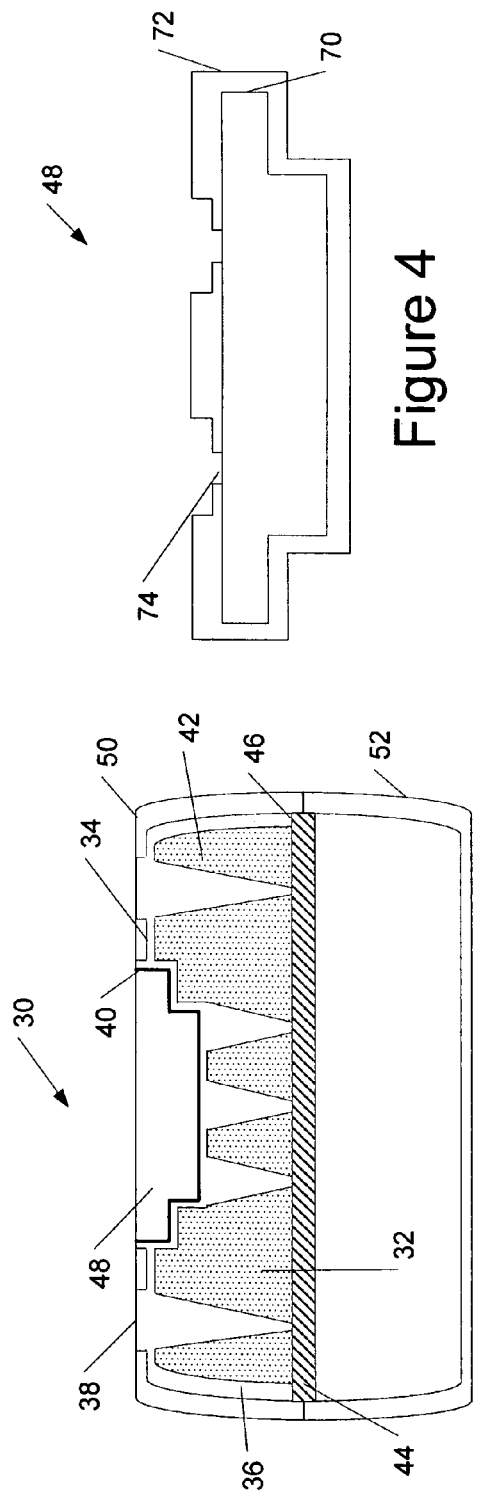
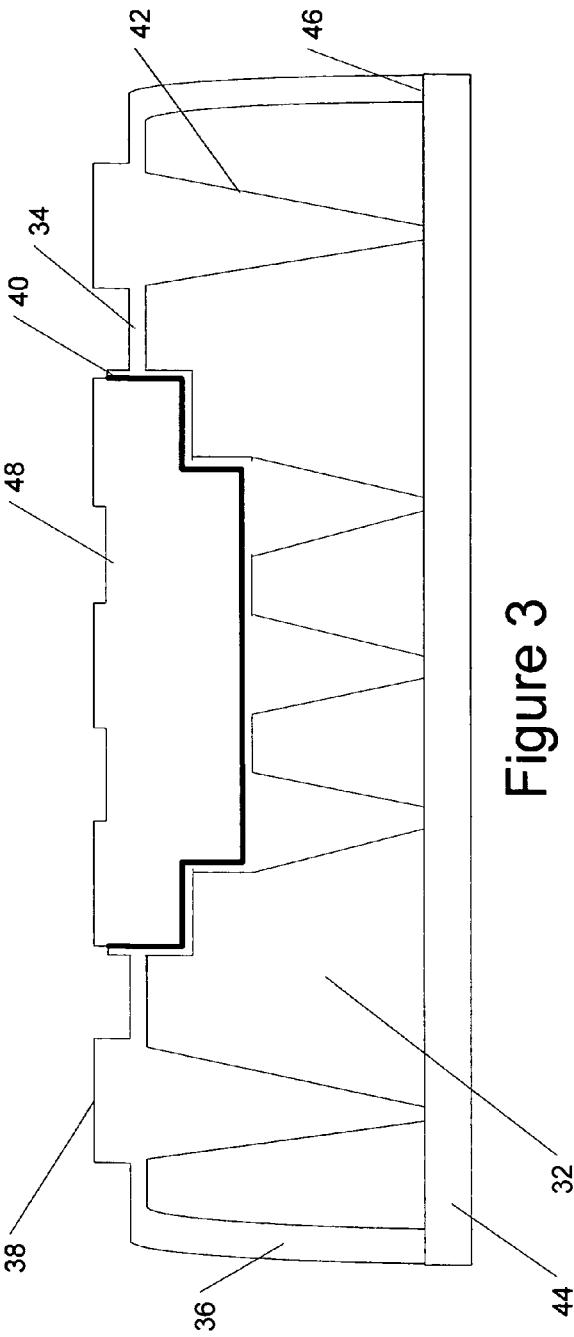
Figure 2
Figure 3
Figure 4

PORTABLE HANDSET WITH INTEGRATED SPEAKER

FIELD OF THE INVENTION

The present invention relates generally to the field of handsets for wireless communications, and, more particularly, to the placement of an integrated speaker in a handset for a wireless communication apparatus.

DESCRIPTION OF RELATED ART

Wireless communication devices have been around for many years. These devices have become common in everyday personal and professional lives. Often people and businesses look to wireless communications to help solve problems, provide entertainment and make life more convenient.

Professionals use wireless communications devices to conduct business. Families use this technology to keep in touch with each other. While one-on-one communication is useful for portable wireless devices, often there is a need to allow several people in one location to participate on a call. In order to satisfy the demands of consumers, manufacturers are answering the request by adding conference modes to wireless handsets. More particularly, this enables a wireless handset, at selected times, to operate as a conferencing speakerphone.

Wireless handsets are portable by design, and consumers are driving manufactures to make even smaller, but more powerful, handsets. Since space is limited, technical advancements are often restricted by space restrictions. For example, many consumers use a speaker phone in a home or office environment. In these environments, the speaker phone may have a large speaker and the speaker may be positioned for optimum speech clarity. Also, since the speaker phone is likely powered by a dedicated power line, significant amplification and noise cancellation may be applied. Unfortunately, a wireless handset offers a much more restrictive environment for a speaker phone: the wireless handset has limited power and limited processing capabilities; the wireless handset is small, and therefore may not accommodate a large speaker; and, it is difficult to direct the speaker. Because of these and other difficulties, known speaker phones may suffer from low quality, may be cumbersome to use, and may lead to an unsatisfactory user experience.

In providing known wireless speaker phones, some manufactures use the standard speaker used for the earpiece as a conference speaker. The result is limited volume intensity and an often undesirable sound quality. Other manufactures use a second speaker located inside the wireless handset. Often, the speaker is positioned to project sound out the back of the phone where a user commonly places their hand. Using the speakerphone in this manner is cumbersome, as the phone preferably must be laid on its face on a support surface, or held backwards to properly project sound. This in turn, blocks the microphone hindering the caller from hearing the users conversation.

In an alternative arrangement, the second speaker may have a set of complex internal channels or vents to route the sound from the second speaker to a front port. Although this enables the sound to be emitted from the front of the phone, the internal channels are complex and expensive to design and manufacture, and consume valuable space within the phone's housing. Manufacturers have directed conference speaker sound to the side or front of the phone through these channels. Channeling sound in this manner results in reduced sound quality, increased design costs, manufacturing costs and space consumption. When venting the sound out the side of a handset, similar problems endure with regard to hand placement issues and quality. Channeling sound to the front of a handset has comparable problems. The channeled speaker sound may also be unidirectional. A user located only in the direction of the opening best hears sound emitted.

As portable wireless handset capabilities advance, the uses of such devices evolve. For example, multimedia options are now commonplace on a wide variety of wireless devices. Mobile phone users want to be able to listen to quality sound files, but the limitations in mobile phone design and speaker placement limit the quality for multimedia performance. The speakers used in the typical wireless handset today are of limited acoustic capability and their use in multimedia applications result in a less that desirable outcome.

The ability to utilize a portable wireless device as both a quality speakerphone and a multimedia device would result in a more pleasant user experience. It is therefore desirable to provide a wireless handset with a capable speaker arrangement for improved acoustic performance.

SUMMARY OF THE INVENTION

Briefly, the present invention provides a portable wireless handset with enhanced acoustic functions. The wireless handset has a chamber gasket that has an opening sized to receive a speaker. When inserted into the opening, the speaker seals to the chamber gasket. The chamber gasket also seals to a support surface, so that a sealed acoustic chamber is created. In one example, the chamber gasket is a flexible keypad for a wireless handset. The keypad has an opening in the user interface area for receiving a speaker, and a navigation input key may be positioned over the speaker. In this way, the speaker shares an area with the navigation key, and projects sounds through vents in the navigation key. With the speaker sealed to the keypad, and the keypad sealed to a printed circuit board, a sealed acoustic chamber is formed. Acoustic energy emitted from the back of the speaker is received into the sealed chamber, thereby improving the sound quality for sound projected from the front of the speaker.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 2 is a cross sectional view of a portable handset with integrated speaker.

FIG. 3 is an enlarged cross sectional view of a sealed acoustic chamber.

FIG. 4 is a cross sectional view of a navigation-speaker button.

DETAILED DESCRIPTION OF THE INVENTION

Figure 1:
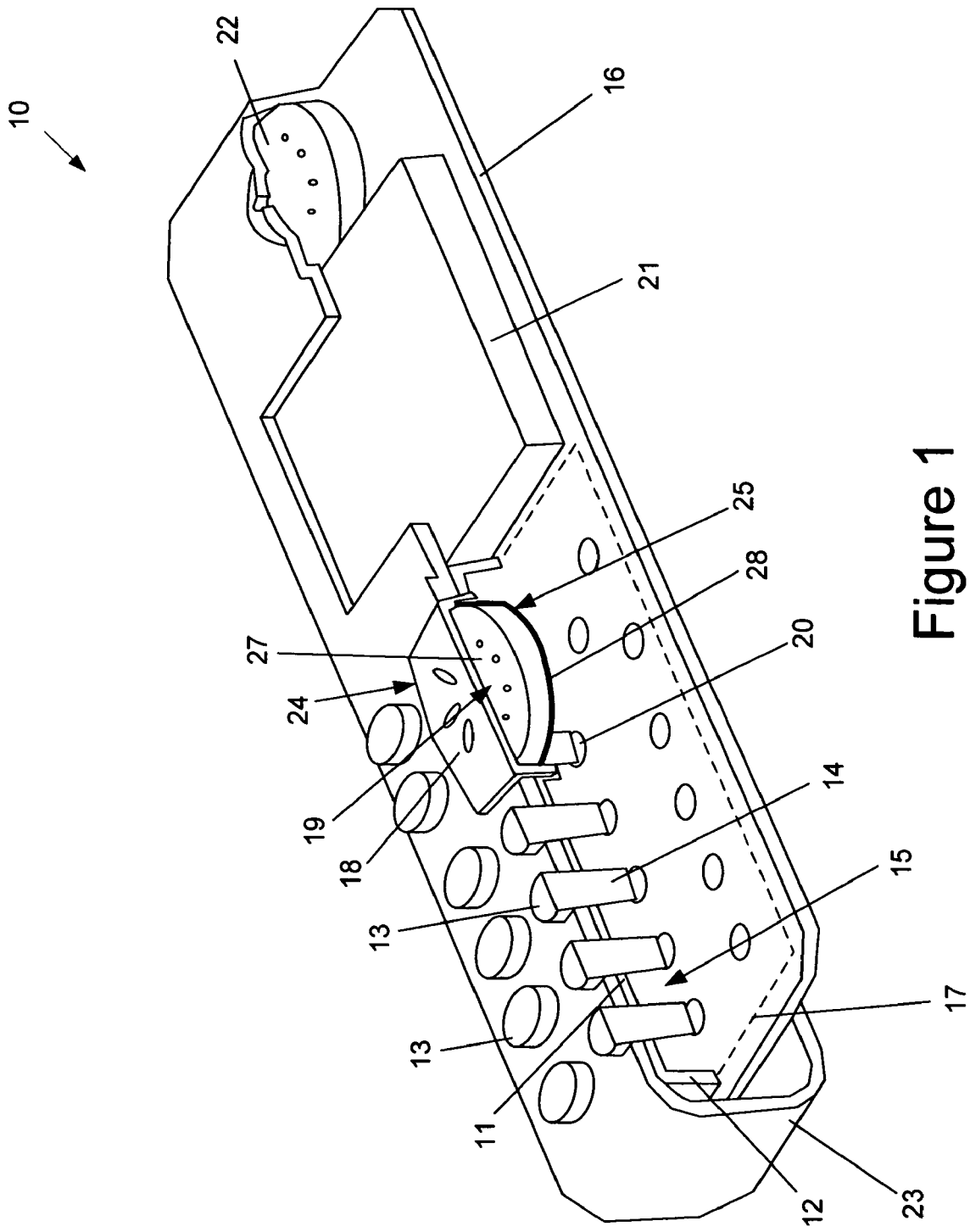
FIG. 1 is a perspective cross sectional view of a portable handset with integrated speaker.

Portable wireless handset are widely used and nearly ubiquitous today. The portable wireless handset is used extensively for both personal enjoyment and professional applications. Because of its popularity, consumers demand new, useful and innovative functions to be associated with this device. One popular function desired in a portable wireless handset is the push-to-talk feature, which generally allows the handset to be used in a walkie-talkie mode. In the push-to-talk mode, a user is enabled to quickly establish communication with predefined individuals or groups, without using the normal call-placement procedures. When using push-to-talk, it is customary for a user to hold the handset well away from the ear. Accordingly, the handset usually has a speaker that projects received communications into the immediate area. The user is thereby able to use the handset without having the handset or hands-free device next to their ear. Such an arrangement may be useful, for example, when the user is wearing a hard-hat, or when the user must have more freedom of movement.

Another popular application uses the wireless handset to provide for speakerphone operation. When using the wireless handset as a speaker phone, the user's hands do not need to hold the handset, so may used for other purposes. Also, such a speaker phone function allows a group to listen to the far end voice signal being broadcast by the wireless handset. Additionally, there is strong desire to perform multimedia operations on portable wireless handsets. To enable these advanced audio functions, a portable wireless handset needs a speaker capable of producing high quality sound while being small enough to fit in a small housing of a portable wireless handset. It is highly desirable that when arranging a speaker in a portable wireless handset, that there is a cavity or fixed volume available behind the speaker for better acoustic performance.

Furthermore, because of the typical hand positioning on portable wireless handsets, the location of such a speaker is important. Many portable wireless handsets are designed for the user to hold the rear portion of the handset while placing the front of the handset in proximity to the user's face or cheek as to allow the user to hear communications while simultaneously speaking into a microphone. A popular position for a speaker is the rear portion of a handset, because it is relatively unused and can provide the necessary cavity for quality speaker sound. Positioning a speaker in the rear of the phone would result in a muffled sound experienced by a user of the handset. The reduced sound quality associated with a rear positioned speaker has been remedied by creating ducting in the phone, as to channel the sound from the rear to the front of the handset. This method is relatively costly and may increase the size of the handset.

A better location for such a speaker would be the front of the phone, since the positioning of a user's hand customarily does not block that portion of the handset. A particularly desirable position for a speaker that is to be utilized as a multimedia audio source or speakerphone is located in the center of the phone. For example, when the handset is used as a MIDI player or a speakerphone, the handset can be placed "face up" on a solid base without interference to the sound quality or creating damage to the front portion of the handset. In the event that a user places the earpiece of the handset to his/her ear and simultaneously receives a call, the mid-section speaker may be used to emit the call alert sound. Since the call-alert speaker is spaced apart from the earpiece speaker, the incoming call alert is not directly projected into the user's ear. Because the mid-section on the front of the phone is an advantageous position, an obstacle arises with placement. Most if not all of the user's interface with the handset is performed using the front control keys, buttons and display. To simplify user interaction, the typical mobile phone uses a full array of controls and keys, with little space available for any additional feature such as a speaker.

Referring now to FIG. 1, portable handset 10 with integrated speaker is illustrated. Portable handset 10 advantageously provides a high quality audio experience, while enabling a front-projecting speaker system. Portable handset 10 has two related structures which cooperate to provide the enhanced sound experience. First, portable handset 10 includes sealed acoustic chamber 15. Second, portable handset 10 has "front-firing" speaker 19, which shares an area on the user interface with navigation key 24. In this way, a high quality speaker system is provided without need to enlarge the portable phone housing or rearrange the user interface.

Sealed acoustic chamber 15 is created by modifying the manufacture of a keypad to form chamber gasket 11. Chamber gasket 11 has sealing lip 12 around its base perimeter that assists in creating a sealed acoustic chamber. Chamber gasket 11 may also have a plurality of input buttons 13, and a plurality of connector posts 14. Buttons 13 and posts 14 cooperate to allow a user to push on a button, and have that button's corresponding post depress a pressure sensitive area on the device's printed circuit board. In this way, the user is allowed to make selections and give commands to the mobile phone. Opening 25 is defined near the user interface, and is sized to receive speaker 19. In the illustrated example, speaker 19 is positioned below navigation key 24. In this way, navigation key 24 and speaker 19 share the valuable and limited space available for the user interface.

Portable handset 10 may be, for example a portable telephone radio, a walkie-talkie, a personal data assistant, a digital audio player, or other device intended to project sound. It will be appreciated that chamber gasket 11 may be an elastic membrane, constructed from a material similar to the material used in portable wireless handsets as a key pad. However, gasket 11 is constructed and arranged to establish and define sealed acoustic chamber 15. In one arrangement, chamber gasket 11 is manufactured from neoprene. It will also be appreciated that chamber gasket 11 may be made from a flexible plastic or other similar materials.

In providing sealed acoustic chamber 15, sealing lip 12 is compressed to support surface 16 along seal interface 17. Also, speaker 19 is sealed into opening 25. A sealed acoustic chamber is thereby created between chamber gasket 11 and support surface 16. In this way, acoustic energy emitted from back 28 of speaker 19 is directed into sealed acoustic chamber 15, enhancing the quality of sound emitted from front side 27 of speaker 19. Sealed chamber 15 is of sufficient volume to produce pleasing audio from a speaker 19. It will be appreciated that changing the thickness of connector posts 14 and the size of chamber gasket 11 may vary the acoustic characteristics of sealed chamber 15. Accordingly, a change in sealed acoustic chamber 15 will result in a change in tone projected from speaker 19. In one particularly efficient construction, a printed circuit board is used as support surface 16. It will also be appreciated that support surface 16 may be manufactured from various materials such that when sealing lip 12 is compressed to support surface 16, sealed chamber 15 is formed.

FIG. 1 further illustrates navigation-speaker button 24 having speaker grill 18 sharing user interface area 26 with speaker 19. More particularly, speaker 19 is inserted and sealed into opening 25 in chamber gasket 11. Navigation-speaker button 24 is operably connected by connector posts 14 to activate a plurality of navigation controls 20. Speaker grill 18 operates as an input device while also providing a housing for speaker 19. Speaker grill 18 may be manufactured from a hard plastic to ensure adequate protection of speaker 19 during use as an input device. Display 21 and earpiece speaker 22 is located above sealed chamber 15, which is enclosed by housing 23. In an alternate embodiment sealed chamber 15 is formed by coupling sealing lip 12 to sealing surface 17 while additionally sealing display 21 to housing 23 resulting in a increased volume of the sealed chamber 15. It will be appreciated that the sealing chamber may be formed in other internal volumes of the handset.

Referring now to FIG. 2, a cross sectional view of a portable handset with integrated speaker is illustrated. Portable handset 30 contains sealed acoustic chamber 32 similar to sealed acoustic chamber 15 referenced in FIG. 1. Similarly, in order to form sealed acoustic chamber 32, chamber gasket 34 is provided having sealing lip 36, a plurality of input buttons 38, opening 40 and a plurality of connector posts 42. It will be appreciated that chamber gasket 34 is manufactured from materials that are elastic in nature while able to create an airtight seal if formed and compressed as illustrated. Sealing lip 36 is operably seated on support surface 44 at seal interface 46. As illustrated, support surface 44 is a printed circuit board providing electronic functionality for the mobile wireless device. It will be appreciated that other internal support surfaces or housing walls may be used as a support surface for a chamber gasket. FIG. 2 exemplarily illustrates the character of opening 40, as it is associated with chamber gasket 34. Opening 40 is manufactured to accommodate navigation-speaker button 48. Navigation-speaker button 48 is placed inside hole or opening 40 and sealed to chamber gasket 34. Intermittent depression of navigation-speaker button 48 may temporarily cause a leak in sealed acoustic chamber 32 while button 48 is being depressed. Due to the elastic nature of chamber gasket 34, when button 48 is released, chamber gasket 34 will regain its original shape and reform sealed acoustic chamber 32. Portable handset 30 further includes front housing 50 and rear housing 52. It will be appreciated that front housing 50 and rear housing 52 are routinely manufactured in the field. Commonly used materials include molded hard plastic, metal, or rubber. The depiction of shape and size is not recognized as mandatory for the function of portable handset 30.

Referring now to FIG. 3, a cross sectional view of sealed acoustic chamber is illustrated. Sealed acoustic chamber 32 is established by compressing chamber gasket 34 to support surface 44 at seal interface 46. It will be understood that support surface 44 is manufactured to be a smooth surface, without circuitry or connectors as to ensure a gap-free seal interface 46 with chamber gasket 34. It can be further appreciated that sealed acoustic chamber 32 may still be formed with variations on sealing surface 44 so long as the material used to manufacture chamber gasket 34 is pliable enough to compensate for the variations on support surface 44 and form sealed acoustic chamber 32. FIG. 3 further illustrates chamber gasket 34 having sealing lip 36, a plurality of input buttons 38, navigation-speaker button 48 inserted in opening 40, and a plurality of connector posts 42.

Referring now to FIG. 4, a cross sectional view of a navigation-speaker button is illustrated. Navigation-speaker button 48 includes speaker 70 installed inside navigation button 72 and a plurality of speaker vents 74. It will be appreciated that there are many methods for manufacturing and securing speaker 70 inside navigation button 74. In one embodiment navigation button 74 is manufactured in two pieces and speaker 70 is inserted between them before installation as navigation-speaker button 48.

Figure 5:
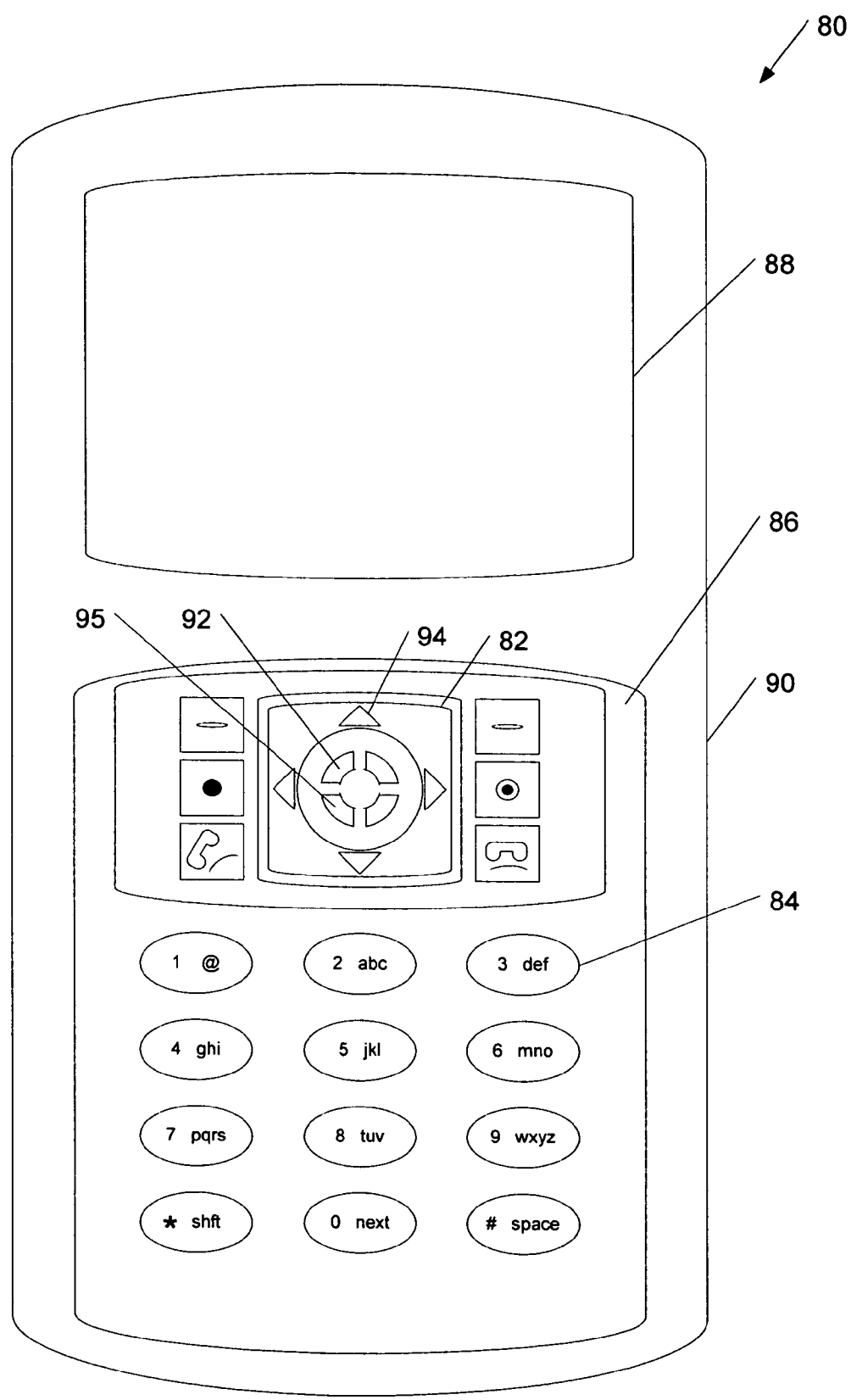
FIG. 5 is a top view of a portable handset with integrated speaker.

Referring now to FIG. 5, a top view of a portable handset with integrated speaker is shown. Portable handset 80 has a navigation-speaker button 82, a plurality of input buttons 84, input section 86, display 88, and housing 90. Navigation-speaker button 82 is located in close proximity to the top of input section 86, which optimally coincides with the mid-section of portable handset 80. Placing the navigation-speaker button 82 in the mid section of portable 80 has several desirable consequences. For example, users are accustomed to having the main navigation key control in the central area of the user interface. By maintaining this location, the user will be more comfortable with interacting with portable handset 80. It can also be appreciated that when a user is holding the portable handset 80 with integrated speaker, the hand and fingers will not cover navigation-speaker button 82. As illustrated, speaker 95 is positioned behind the navigation key 82. Speaker 95 is front-firing, allowing sound to be projected through the speaker vents 92, and to one or more users. Since speaker 95 is front-firing, it is generally acoustically efficient, and does not require any complex venting or chambering structures. Also, speaker 95 does not take up any meaningfully amount of user interface area, as speaker 95 is positioned behind navigation key 82. Finally, since the back side of the speaker 95 emits into a sealed acoustic chamber, the quality of sound and efficiency of the speaker may be enhanced.

FIG. 5 further illustrates navigation-speaker button 82 having a plurality of speaker vents 92 and a plurality of directions keys 94. In one embodiment navigation-speaker button 82 utilizes four directional keys and a center input. One key is used for upward positioning, one for downward positioning, one for leftward positioning, one for rightward positioning, and a center input programmable as a enter key. Although FIG. 5 illustrates speaker 95 behind navigation key 82, it will be understood that other types of keys or controls may be used.

Figure 6:
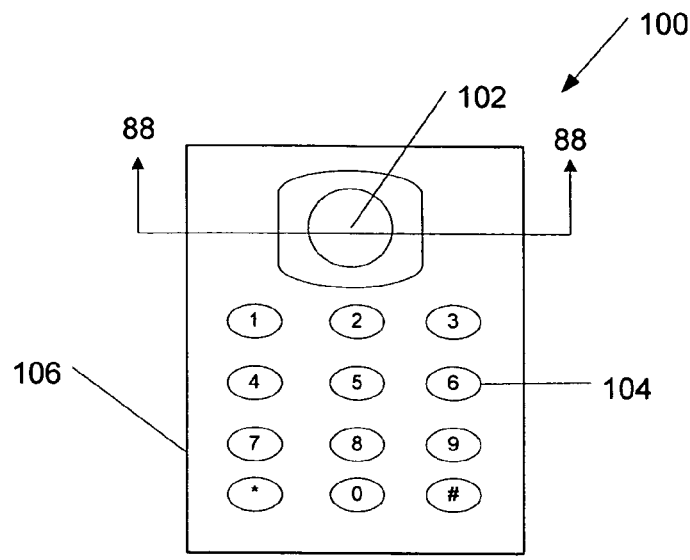
FIG. 6 is a top view of a chamber gasket.

Referring now to FIG. 6, a top view of chamber gasket 100 is illustrated. Chamber gasket 100 includes opening 102, a plurality of input keys 104 on the top of chamber gasket 100, and side wall 106. In one embodiment the general shape of chamber gasket 100 is square. It can be appreciated that the shape of chamber gasket 100 can be in any form necessary to achieve a sealed acoustic chamber while accommodating circuitry, structural matters and handset shape. It will also be appreciated that other materials and structures may be added to adjust the size and response of the acoustic chamber.

Figure 7:
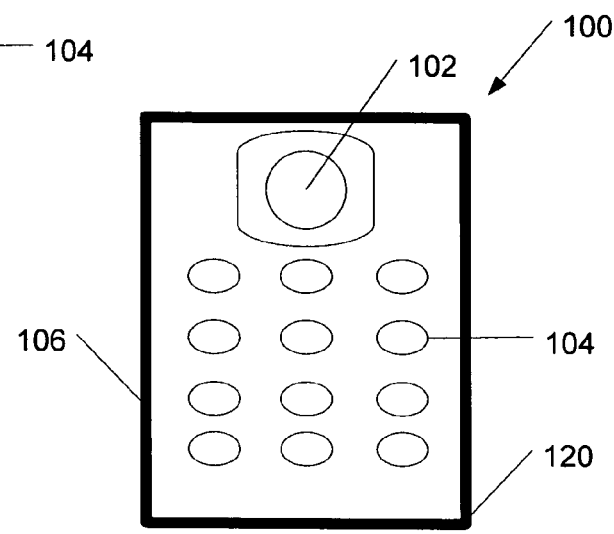
FIG. 7 is a bottom view of a chamber gasket.

Referring now to FIG. 7, a bottom view of chamber gasket 100 is illustrated. Chamber gasket 100 further includes sealing lip 120 that extends around the perimeter of side walls 106. Sealing lip 120 is constructed to seal to a sealing interface on a support surface. Sealing lip 120 may be integrally formed with sidewall 106, or may be a discrete member adhered to sidewall 106. In one particular example, the top of the chamber gasket, sidewalls 106, and sealing lip 120 are integrally formed of the same flexible material. It will be appreciated that other constructions and materials may be use.

Figure 8:
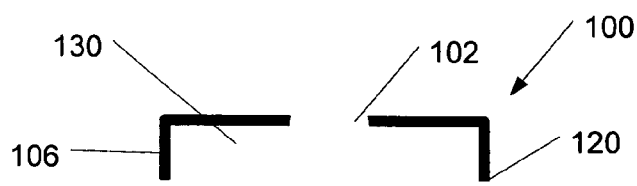
FIG. 8 is a cross-sectional view of a chamber gasket.

Referring now to FIG. 8, there is shown a cross-sectional view of chamber gasket 100 of FIG. 6 taken along line 88. Chamber gasket 100 includes a space for a sealed acoustic chamber 130, opening 102, sidewall 106, and sealing lip 120. When a speaker is sealed into opening 102, and sealing lip 120 is sealed against a support surface, then the space 130 will act as a sealed acoustic chamber, as shown in FIG. 9.

Figure 9:
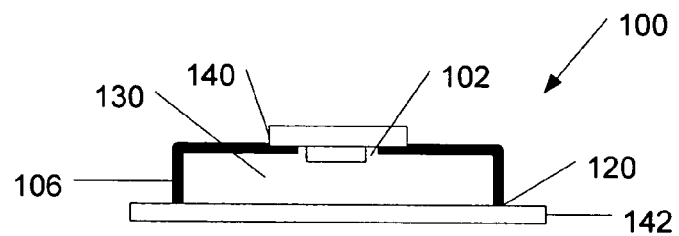
FIG. 9 is a cross-sectional view of a sealed acoustic chamber.

Referring now to FIG. 9, a cross-sectional view of a sealed acoustic chamber is illustrated. FIG. 9 is similar to FIG. 8, therefore only differences will be discussed. FIG. 9 illustrates chamber gasket 100 further including navigation-speaker button 140 and support surface 142. Navigation-speaker button 140 is inserted into opening 102, thereby creating a seal between chamber gasket 100 and navigation-speaker button 140. As the portable handset with integrated speaker is manufactured, chamber gasket 100 is placed onto support surface 142 so that sealing lip 120 is compressed against a sealing interface on the support surface. When manufacturing is complete, a sealed acoustic chamber 130 is formed. In one example, support surface 142 is a printed circuit board for the mobile wireless device.

Figure 10:
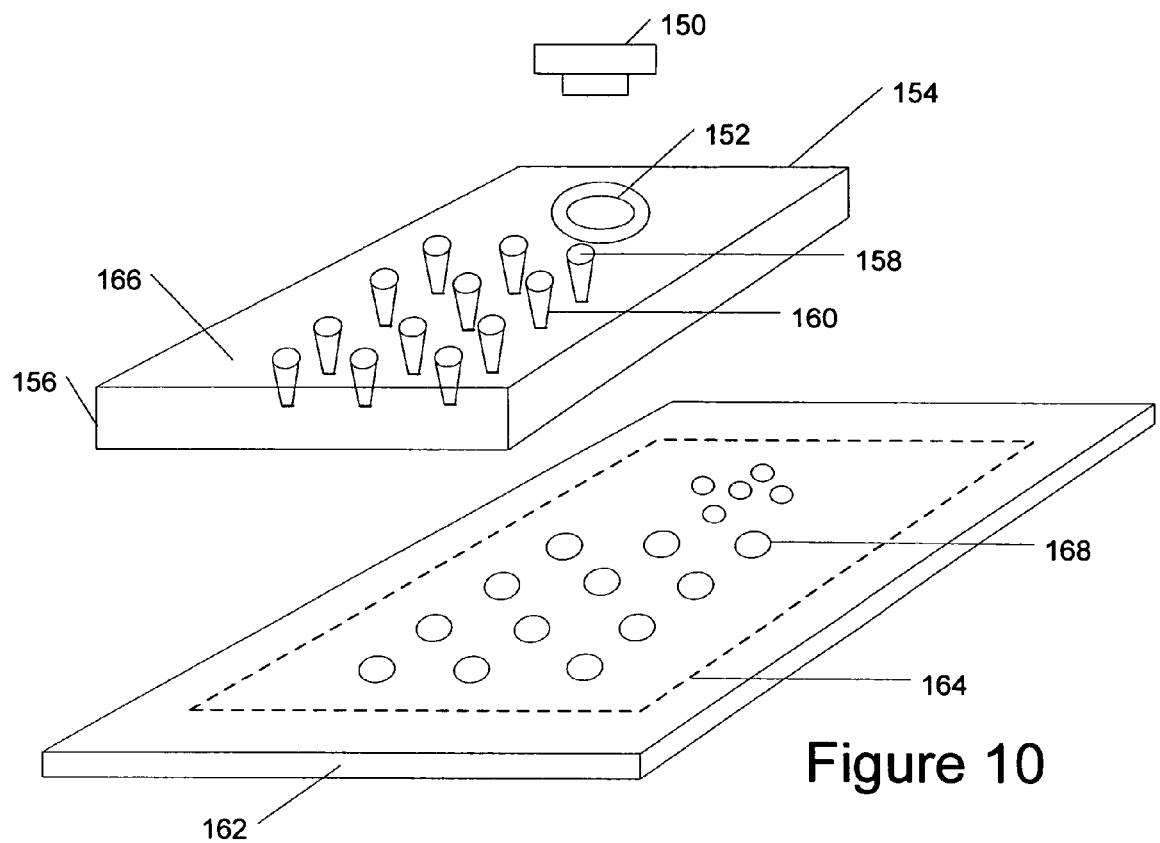
FIG. 10 is an exploded view of a speaker, a chamber gasket, a support surface, and a sealing surface.

Referring now to FIG. 10, an exploded view of navigation-speaker button 150, chamber gasket 154, and a sealing surface 162 is illustrated. FIG. 10 illustrates navigation-speaker button 150 able to be placed into opening 152 on chamber gasket 154. Navigation-speaker button 150 is manufactured to make a tight fit when inserted into opening 152, thereby creating a seal. Subsequently, FIG. 10 further illustrates, a chamber gasket 154 having a sealing lip 156, input keys 158 and connector posts 160. Finally, FIG. 10 illustrates support surface 162 having seal interface 164 and a plurality of contact points 168. It can be appreciated that when sealing lip 156 is mated with support surface 162 at seal interface 164, sealed acoustic chamber 166 is formed. In one example, support surface 142 is a printed circuit board for the mobile wireless device.

Figure 11:
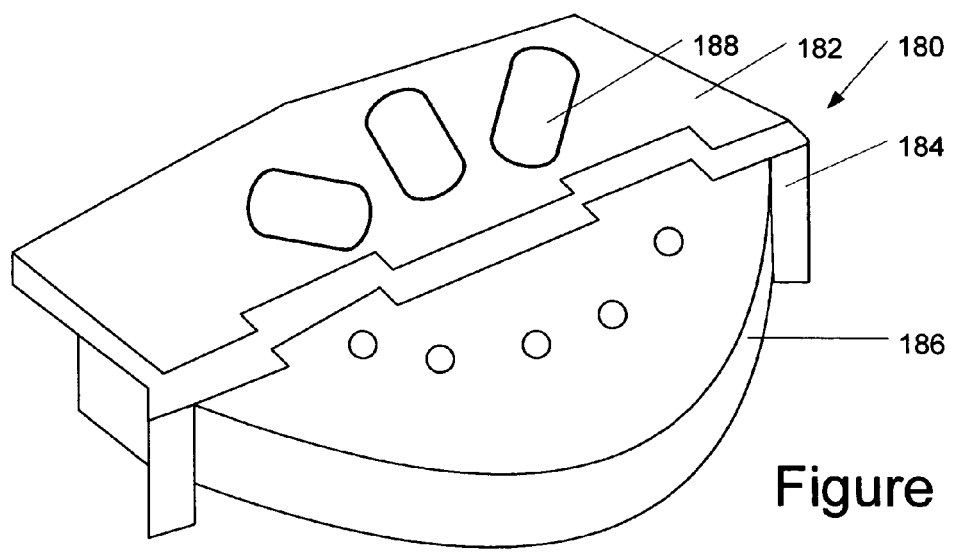
FIG. 11 is a partial view of a navigation-speaker button.

Referring now to FIG. 11, an elevational view of a navigation-speaker button is illustrated. FIG. 11 illustrates navigation-speaker button 180 having speaker grill 182, sub-piece 184, and speaker 186. In one embodiment, speaker grill 182 is manufactured with a plurality of openings 188. It can be appreciated that openings 188 permit sound produced by speaker 186 to project through speaker grill 182. It will be further appreciated that openings 188 can vary in size, shape and quantity.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A portable handset, comprising:
   a housing having a top end, a bottom end, and a front face;
   a display on the front face disposed between the top end and the bottom end;
   a first earpiece speaker located on the front face between the top end of the housing and the display;
   a single printed circuit board that extends the length of the portable handset from the top end to the bottom end, wherein the single printed circuit board includes a plurality of pressure sensitive areas associated with a numeric keypad;
   a numeric keypad chamber gasket having a plurality of input keys and a plurality of connector posts, wherein the numeric keypad chamber gasket is disposed between the display and the bottom end, the numeric keypad chamber gasket configured to interface with the single printed circuit board and the connector posts configured to interface with the pressure sensitive areas on the single printed circuit board;
   a sealed acoustic chamber that is enclosed by the numeric keypad chamber gasket, the sealed acoustic chamber comprising,
   the numeric keypad chamber gasket having an opening and a sealing lip, wherein the buttons and posts cooperate with a depressed button push on the pressure sensitive area on the printed circuit board,
   a navigation-speaker button received by the opening located on the front face of the housing and disposed between the bottom end of the housing and the display, the navigation-speaker button including,
       at least one directional key configured to provide upward positioning, downward positioning, leftward positioning, and rightward positioning, and
       a second audible speaker disposed behind the directional key, and
   a sealing interface associated with the numeric keypad chamber gasket constructed to receive the sealing lip, the sealing interface arranged on the printed circuit board.

2. The speaker chamber according to claim 1, wherein the chamber gasket is constructed as a unitary membrane.

3. The speaker chamber according to claim 1, wherein the chamber gasket is constructed from a plurality of gasket pieces.

4. The speaker chamber according to claim 1, wherein the navigation-speaker button is mounted on a front side of the housing.

5. The speaker chamber according to claim 4, further including a speaker grill positioned in front of the navigation-speaker button.

6. The speaker chamber according to claim 5, wherein the speaker grill is operatively coupled to the directional key corresponding to the navigation-speaker button.

7. The speaker chamber according to claim 1, wherein the support surface is a printed circuit board.

8. A portable handset, comprising:
   a housing having a top end, a bottom end, and a front face;
   a radio, antenna, display, and input buttons in the housing;
   a display on the front face disposed between the top end and the bottom end;
   a first earpiece speaker located on the front face between the top end of the housing and the display;
   a single printed circuit board that extends the length of the portable handset from the top end to the bottom end, wherein the single printed circuit board includes a plurality of pressure sensitive areas associated with a numeric keypad;
   a numeric keypad chamber gasket having a plurality of input keys and a plurality of connector posts, wherein the numeric keypad chamber gasket is disposed between the display and the bottom end, the numeric keypad chamber gasket configured to interface with the single printed circuit board and the connector posts configured to interface with the pressure sensitive areas on the single printed circuit board;
   a sealed acoustic chamber that is enclosed by the numeric keypad chamber gasket, the sealed acoustic chamber comprising,
   the numeric keypad chamber gasket having an opening and a sealing lip, wherein the buttons and posts cooperate with a depressed button push on the pressure sensitive area on the printed circuit board,
   a navigation-speaker button received by the opening located on the front face of the housing and disposed between the bottom end of the housing and the display, the navigation-speaker button including,
       at least one directional key configured to provide upward positioning, downward positioning, leftward positioning, and rightward positioning, and a second audible speaker disposed behind the directional key having a front side and a back side, a sealing interface associated with the numeric keypad chamber gasket constructed to receive the sealing lip, the sealing interface arranged on the printed circuit board;

wherein the sealed acoustic chamber formed by the numeric keypad chamber gasket, printed circuit board, and navigation-speaker button is configured to receive acoustic energy from the back side of the second speaker to enhance the quality of sound emitted from the front side of the second speaker.

9. The portable handset according to claim 8, wherein the navigation-speaker button is mounted on a front side of the housing.

10. The portable handset according to claim 9, further including a speaker grill positioned in front of the navigation-speaker button.

11. The portable handset according to claim 10, wherein the speaker grill is operatively coupled to the directional key corresponding to the navigation-speaker button.

12. The portable handset according to claim 8, wherein the radio is a portable telephone radio.

13. The portable handset according to claim 8, wherein the radio is compliant with CDMA, WCDMA, GSM, GPRS, CDMA2000, PHI or UMTS.

14. The portable handset according to claim 8, wherein the radio is a walkie-talkie radio.

15. The speaker chamber according to claim 8, wherein the support surface is a printed circuit board.

16. A portable wireless handset, comprising:
a housing having a top end, a bottom end, a front face, and a center front face;
a radio and antenna in the housing;
a display disposed between the top end and the center front face;
a first earpiece speaker located on the front face between the top end of the housing and the display;
a single printed circuit board that extends the length of the portable handset from the top end to the bottom end, wherein the single printed circuit board includes a plurality of pressure sensitive areas associated with a numeric keypad;
a numeric keypad chamber gasket having a plurality of input keys and a plurality of connector posts, wherein the numeric keypad chamber gasket is disposed between the display and the bottom end, the numeric keypad chamber gasket configured to interface with the single printed circuit board and the connector posts configured to interface with the pressure sensitive areas on the single printed circuit board;
a sealed acoustic chamber that is enclosed by the numeric keypad chamber gasket, the sealed acoustic chamber comprising,
the numeric keypad chamber gasket having an opening and a sealing lip, wherein the buttons and posts cooperate with a depressed button push on the pressure sensitive area on the printed circuit board,
a navigation-speaker button received by the opening located at the center front face of the housing, the navigation-speaker button including at least one directional key configured to provide upward positioning, downward positioning, leftward positioning, and rightward positioning, and
a second audible front-firing speaker disposed at the center front face behind the directional key having a front side and a back side, wherein the second audible front-firing speaker is configured to be audible in an immediate area,
a sealing interface associated with the numeric keypad chamber gasket constructed to receive the sealing lip, the sealing interface arranged on the printed circuit board; and
wherein the sealed acoustic chamber formed by the numeric keypad chamber gasket, printed circuit board, and navigation-speaker button is configured to receive acoustic energy from the back side of the second speaker to enhance the quality of sound emitted from the front side of the second speaker.

17. The portable wireless handset according to claim 16, wherein the sealed chamber includes a volume under the display.

18. The portable wireless handset according to claim 16, wherein the sealed chamber includes a volume between a surface of the housing and the printed circuit board.

* * * * *